(No Model.)

W. T. JONES.
COFFEE AND TEA POT.

No. 320,561. Patented June 23, 1885.

WITNESSES
F. L. Ourand
L. L. Miller

INVENTOR
William T. Jones
per Chas. H. Fowler
Attorney

N. PETERS, Photo-Lithographer, Washington, D. C.

UNITED STATES PATENT OFFICE.

WILLIAM T. JONES, OF WOODSTOCK, IOWA.

COFFEE AND TEA POT.

SPECIFICATION forming part of Letters Patent No. 320,561, dated June 23, 1885.

Application filed March 15, 1884. (No model.)

*To all whom it may concern:*

Be it known that I, WILLIAM T. JONES, a citizen of the United States, residing at Woodstock, in the county of Wright and State of Iowa, have invented certain new and useful Improvements in Coffee and Tea Pots; and I do hereby declare that the following is a full, clear, and exact description of the same, reference being had to the annexed drawings, making a part of this specification, and to the letters and figures of reference marked thereon.

Figure 1:
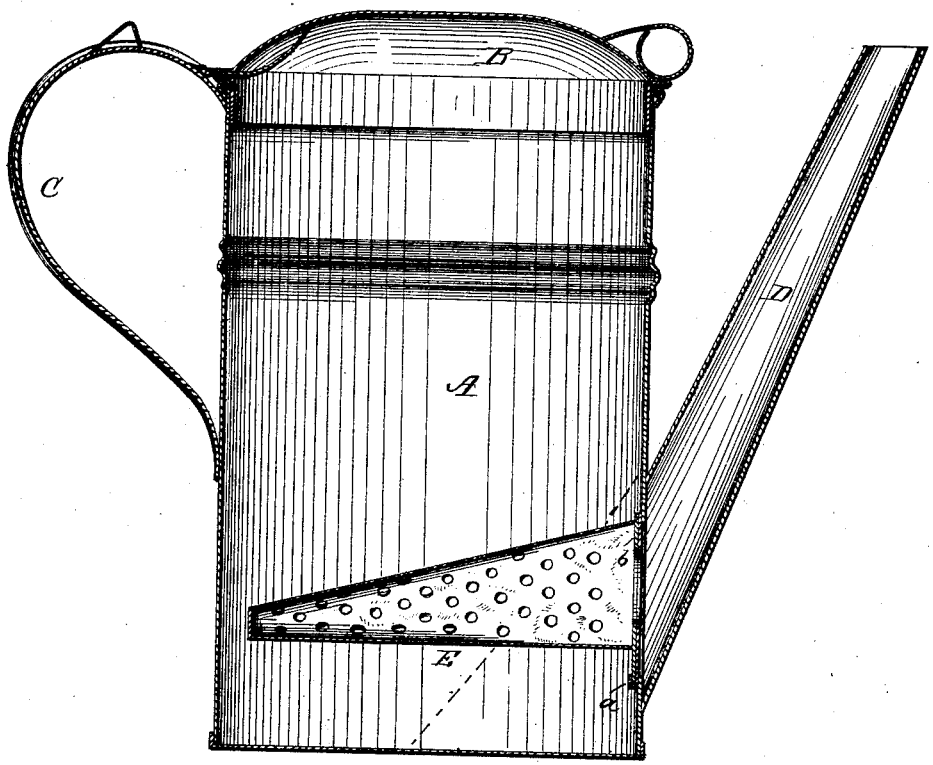
Figure 2:
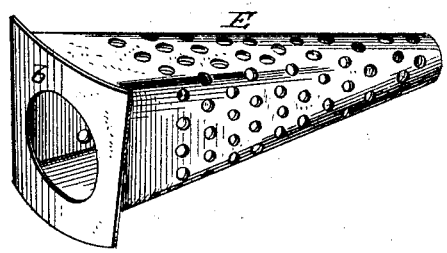

Figure 1 of the drawings is a sectional elevation of a coffee or tea pot embodying my invention, and Fig. 2 a detail view in perspective of the strainer.

The present invention has relation to that class of coffee and tea pots provided with a perforated sheet-metal or wire-gauze strainer secured to the interior thereof over the opening in the lower end of the spout, or detachably connected thereto by suitable flanges and guides.

Previous to my invention it was common to construct such strainers in the form of a short perforated sheet-metal cone, and permanently secure it in line with the opening in the spout by solder. This conical strainer was not of sufficient length to render it practical, it acting in the same manner as the usual convex perforated plate, while it, being permanently secured in place, could not be removed for cleaning, this being especially necessary in the cone-shape strainers. Now, the object of my invention is to remedy these objections by not only rendering the strainer removable, but also by making the strainer of sufficient length to extend substantially the entire width of the pot, to greatly increase its efficiency. These objects I attain by the construction, substantially as shown in the drawings, and hereinafter described and claimed.

In the accompanying drawings, A represents a coffee or tea pot, provided with the usual cover, B, handle C, and spout D. Upon each side of the opening in the spout D are flanges $a$, or other suitable holding devices, to receive the side edges of a plate, $b$, upon the larger end of a strainer, E. This strainer is preferably constructed of perforated sheet metal, although it may consist of a wire frame covered with suitable cloth, or may be formed of wire-gauze, as found most desirable. It is slightly flattened on its four sides at the larger end, for convenience in attaching the plate $b$. The strainer E is tapering in form, gradually diminishing in diameter as it recedes from the spout D, the lower portion in longitudinal section being on a true horizontal line, while the upper portion is on an angle, as shown in Fig. 1. The object of this incline and convexity of the strainer is to prevent the grounds from settling on the upper surface when the pot is tipped to pour out its contents.

The strainer is removable for cleaning, and is elevated from the bottom of the pot to leave a space for the lodgment of the grounds, and extends diametrically across the pot, as shown. Where the convex perforated plate or short cone is used, there is only a small straining-surface presented, and consequently it will quickly become clogged or stopped up, rendering it necessary to remove the strainer for cleaning. The greater the area of straining-surface the more effective will be the device, and by lengthening the tapering strainer extend substantially the entire width of the pot when the latter is tipped to pour out the contents the perforated smaller end of the strainer will be free from contact with the coffee or tea grounds, the grounds lodging at the lowest point, (shown in dotted lines,) thereby always leaving a portion of the strainer to freely act in discharging the contents of the pot, which would not be the case were the strainer simply in the form of a short cone. The strainer being on a true horizontal line at the bottom thereof gives a greater amount of room for the lodgment of the grounds.

Having now fully described my invention, what I claim as new, and desire to secure by Letters Patent, is—

1. A strainer for coffee and tea pots, tapering in form and extending from the opening in the lower end of the spout, substantially the entire width of the pot, whereby a portion of the strainer will be free from contact with the grounds when the pot is tipped to pour out the coffee or tea, substantially as and for the purpose set forth.

2. A tapering strainer of sufficient length to extend across the coffee or tea pot, substantially the entire width thereof, and provided with means, substantially as described, for detachably connecting it over the opening in the lower end of the spout, substantially as and for the purpose specified.

3. A tapering strainer of sufficient length to extend substantially the entire width of a coffee or tea pot, and provided with a plate at its open end having an opening, said plate extending beyond the sides of the strainer to form flanges, and means for detachably securing the plate around the opening in the spout, substantially as and for the purpose described.

In testimony that I claim the above I have hereunto subscribed my name in the presence of two witnesses.

WILLIAM T. JONES.

Witnesses:
GEO. WAMBACK,
ELIAS T. HALL.